United States Patent
Miao (10) Patent No.: US 9,116,337 B1
(45) Date of Patent: Aug. 25, 2015

(54) INCREASING EFFECTIVE EYEBOX SIZE OF AN HMD

(75) Inventor: Xiaoyu Miao, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 584 days.

(21) Appl. No.: 13/426,439

(22) Filed: Mar. 21, 2012

(51) Int. Cl.
G09G 5/00 (2006.01)
G02B 7/12 (2006.01)
G02B 27/01 (2006.01)

(52) U.S. Cl.
CPC ............ *G02B 27/0101* (2013.01); *G02B 27/01* (2013.01); *G02B 27/0172* (2013.01)

(58) Field of Classification Search
USPC .................................................... 348/41–161
See application file for complete search history.

(56) References Cited

U.S. PATENT DOCUMENTS

| | | |
|---|---|---|
| 4,711,512 A | 12/1987 | Upatnieks |
| 5,076,664 A | 12/1991 | Migozzi |
| 5,093,567 A | 3/1992 | Staveley |
| 5,539,422 A | 7/1996 | Heacock et al. |
| 5,696,521 A | 12/1997 | Robinson et al. |
| 5,715,337 A | 2/1998 | Spitzer et al. |
| 5,771,124 A | 6/1998 | Kintz et al. |
| 5,815,126 A | 9/1998 | Fan et al. |
| 5,844,530 A | 12/1998 | Tosaki |
| 5,886,822 A | 3/1999 | Spitzer |
| 5,896,232 A | 4/1999 | Budd et al. |
| 5,926,318 A | 7/1999 | Hebert |
| 5,943,171 A | 8/1999 | Budd et al. |
| 5,949,583 A | 9/1999 | Rallison et al. |
| 6,023,372 A | 2/2000 | Spitzer et al. |
| 6,091,546 A | 7/2000 | Spitzer |
| 6,172,657 B1 | 1/2001 | Kamakura et al. |
| 6,201,629 B1 | 3/2001 | McClelland et al. |
| 6,204,974 B1 | 3/2001 | Spitzer |
| 6,222,677 B1 | 4/2001 | Budd et al. |
| 6,349,001 B1 | 2/2002 | Spitzer |
| 6,353,492 B2 | 3/2002 | McClelland et al. |
| 6,353,503 B1 | 3/2002 | Spitzer et al. |
| 6,356,392 B1 | 3/2002 | Spitzer |

(Continued)

FOREIGN PATENT DOCUMENTS

| | | |
|---|---|---|
| GB | 2272980 A | 6/1994 |
| WO | WO 96/05533 A1 | 2/1996 |

OTHER PUBLICATIONS

Levola, Tapani, "Diffractive Optics for Virtual Reality Displays", Academic Dissertation, Joensuu 2005, University of Joensuu, Department of Physics, Vaisala Laboratory, 26 pages.

(Continued)

*Primary Examiner* — Sath V Perungavoor
*Assistant Examiner* — Talha Nawaz
(74) *Attorney, Agent, or Firm* — Blakely Sokoloff Taylor & Zafman LLP (57) ABSTRACT

An apparatus for a head mounted display includes light bending optics to deliver display light from an image source to a near-to-eye emission surface for emitting the display light to an eye of a user within an eyebox. An eye tracking camera system acquires an image of the eye for tracking movement of the eye. A controller is coupled to the eye tracking camera system to receive image data and to determine a location of the eye based on the image data. The controller is coupled to an eyebox actuator to dynamically adjust the lateral position of the eyebox based upon the location of the eye to extend an effective size of the eyebox from which the eye can view the display light.

16 Claims, 8 Drawing Sheets

(56) References Cited

U.S. PATENT DOCUMENTS

| | | |
|---|---|---|
| 6,384,982 B1 | 5/2002 | Spitzer |
| 6,538,799 B2 | 3/2003 | McClelland et al. |
| 6,618,099 B1 | 9/2003 | Spitzer |
| 6,690,516 B2 | 2/2004 | Aritake et al. |
| 6,701,038 B2 | 3/2004 | Rensing et al. |
| 6,724,354 B1 | 4/2004 | Spitzer |
| 6,738,535 B2 | 5/2004 | Kanevsky et al. |
| 6,747,611 B1 | 6/2004 | Budd et al. |
| 6,829,095 B2 | 12/2004 | Amitai |
| 6,879,443 B2 | 4/2005 | Spitzer et al. |
| 7,158,096 B1 | 1/2007 | Spitzer |
| 7,242,527 B2 | 7/2007 | Spitzer et al. |
| 7,391,573 B2 | 6/2008 | Amitai |
| 7,457,040 B2 | 11/2008 | Amitai |
| 7,576,916 B2 | 8/2009 | Amitai |
| 7,577,326 B2 | 8/2009 | Amitai |
| 7,643,214 B2 | 1/2010 | Amitai |
| 7,663,805 B2 | 2/2010 | Zaloum et al. |
| 7,672,055 B2 | 3/2010 | Amitai |
| 7,724,441 B2 | 5/2010 | Amitai |
| 7,724,442 B2 | 5/2010 | Amitai |
| 7,724,443 B2 | 5/2010 | Amitai |
| 7,843,403 B2 | 11/2010 | Spitzer |
| 7,900,068 B2 | 3/2011 | Weststrate et al. |
| 8,004,765 B2 | 8/2011 | Amitai |
| 2003/0090439 A1 | 5/2003 | Spitzer et al. |
| 2005/0174651 A1 | 8/2005 | Spitzer et al. |
| 2006/0192306 A1 | 8/2006 | Giller et al. |
| 2006/0192307 A1 | 8/2006 | Giller et al. |
| 2008/0219025 A1 | 9/2008 | Spitzer et al. |
| 2009/0122414 A1 | 5/2009 | Amitai |
| 2009/0146916 A1* | 6/2009 | Moliton et al. ............ 345/8 |
| 2010/0046070 A1 | 2/2010 | Mukawa |
| 2010/0103078 A1 | 4/2010 | Mukawa et al. |
| 2010/0149073 A1 | 6/2010 | Chaum et al. |
| 2010/0278480 A1 | 11/2010 | Vasylyev |
| 2011/0213664 A1 | 9/2011 | Osterhout et al. |
| 2013/0170031 A1* | 7/2013 | Bohn et al. .............. 359/480 |
| 2013/0208014 A1* | 8/2013 | Fleck et al. ............. 345/672 |
| 2014/0104685 A1* | 4/2014 | Bohn et al. .............. 359/473 |

OTHER PUBLICATIONS

Mukawa, Hiroshi et al., "Distinguished Paper: A Full Color Eyewear Display using Holographic Planar Waveguides", SID Symposium Digest of Technical Papers—May 2008—vol. 39, Issue 1, pp. 89-92.

* cited by examiner

INCREASING EFFECTIVE EYEBOX SIZE OF AN HMD

TECHNICAL FIELD

This disclosure relates generally to the field of optics, and in particular but not exclusively, relates to head mounted displays.

BACKGROUND INFORMATION

A head mounted display ("HMD") is a display device worn on or about the head. HMDs usually incorporate some sort of near-to-eye optical system to emit a light image within a few centimeters of the human eye. Single eye displays are referred to as monocular HMDs while dual eye displays are referred to as binocular HMDs. Some HMDs display only a computer generated image ("CGI"), while other types of HMDs are capable of superimposing CGI over a real-world view. This latter type of HMD can serve as the hardware platform for realizing augmented reality. With augmented reality the viewer's image of the world is augmented with an overlaying CGI, also referred to as a heads-up display ("HUD"), since the user can view the CGI without taking their eyes off their forward view of the world.

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. There is certain to be new found practical and leisure applications as the technology evolves; however, many of these applications are limited due to the cost, size, weight, limited field of view, small eyebox, or poor efficiency of conventional optical systems used to implemented existing HMDs. In particular, HMDs that provide only a small eyebox can substantially detract from the user experience, since the CGI image can be impaired, or even disappear from the user's vision, with a slight bump of the HMD or from eye motions.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of a system, apparatus, and method for extending the effective size of an eyebox of a head mounted display ("HMD") using eye tracking data are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
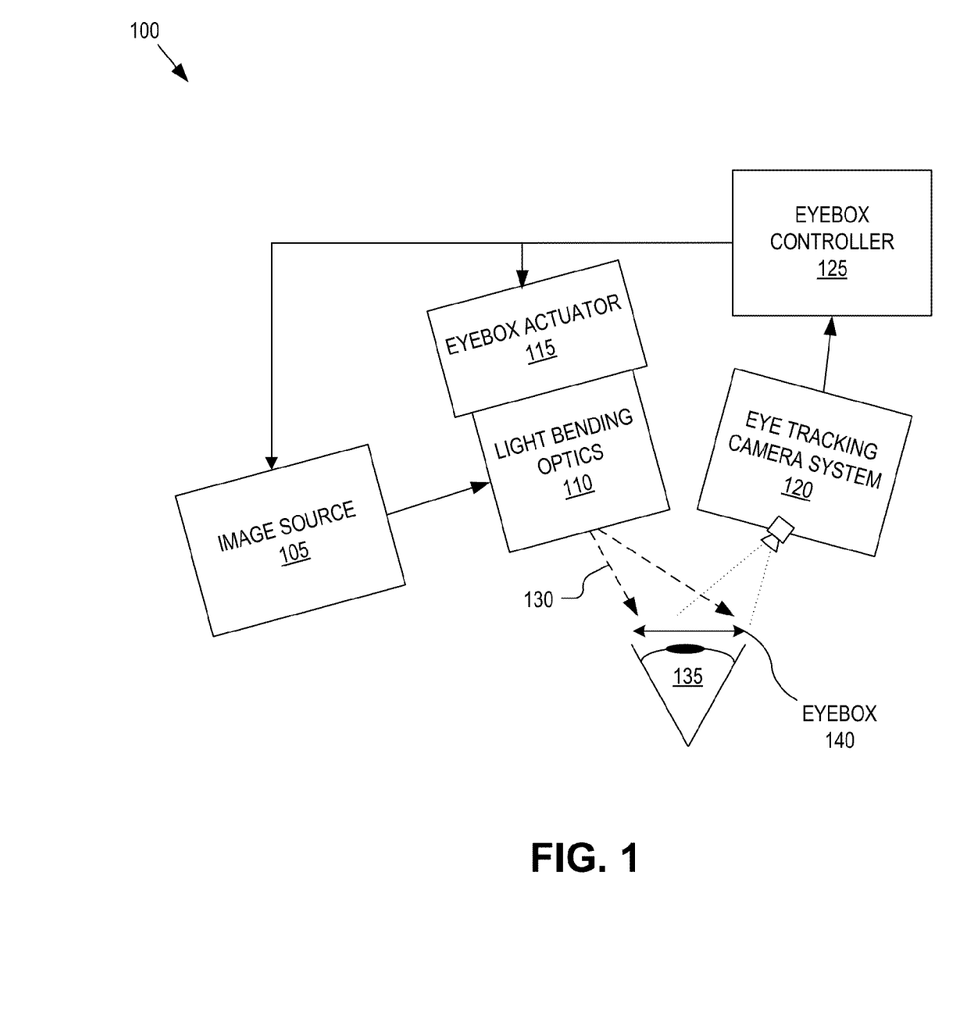
FIG. 1 is a functional block diagram illustrating components of a head mounted display ("HMD") used to extend an effective size of an eyebox of the HMD using eye tracking data, in accordance with an embodiment of the disclosure.

FIG. 1 is a functional block diagram illustrating components of a head mounted display ("HMD") system 100 used to extend an effective size of an eyebox of the HMD using eye tracking data, in accordance with an embodiment of the disclosure. The illustrated HMD system 100 includes an image source 105, light bending optics 110, an eyebox actuator 115, an eye tracking camera system 120, and an eyebox controller 125.

HMD system 100 may be worn on the head of a user to provide a computer generated image ("CGI") 130 (also referred to generically as display light since the light need not be computer generated) to the user's eye 135. In one embodiment, HMD system 100 is a sort of wearable computing device capable of providing a near-to-eye display to the user. The CGI may be provided to eye 135 as a virtual reality ("VR") display, or overlaid over the user's external scene light to augment the user's regular vision. In the later case, HMD system 100 may be referred to an augmented reality ("AR") display.

CGI 130 is displayed to the user's eye 135 within an eyebox 140. Eyebox 140 is a two-dimensional ("2D") box in front of eye 135 from which CGI 130 can be viewed. If eye 140 moves outside of eyebox 140, then CGI 140 misses eye 135 and cannot be seen by the user. If eyebox 140 is too small, then minor misalignments between eye 135 and an emission surface of light bending optics 110 from which CGI 130 is emitted can result in loss of the image. Thus, the user experience is substantially improved by increasing the size of eyebox 140. In general, the lateral extent of eyebox 140 is more critical than the vertical extent of eyebox 140. This is in part due to the significant variances in eye separation distance between humans, misalignments to eyewear tend to more frequently occur in the lateral dimension, and humans tend to more frequently adjust their gaze left and right, and with greater amplitude, than up and down. Thus, techniques that can increase the effective size of the lateral dimension of eyebox 140 can substantially improve a user's experience with a HMD.

Figure 2:
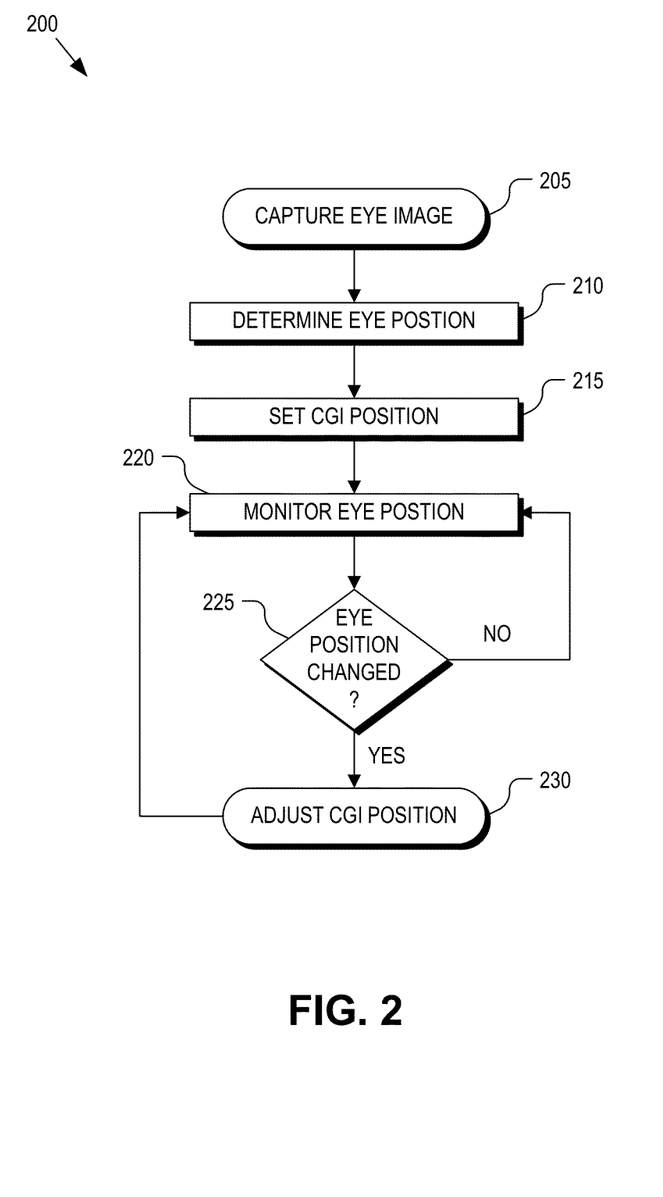
FIG. 2 is a flow chart illustrating a process for extending the effective size of an eyebox of a HMD using eye tracking data, in accordance with an embodiment of the disclosure.

FIG. 2 is a flow chart illustrating a process 200 for extending the effective size of eyebox 140 using eye tracking data, in accordance with an embodiment of the disclosure. HMD system 100 is capable of increasing or extending the effective lateral dimension of eyebox 140. In a process block 205, eye tracking camera system 120 obtains an eye image of eye 135 in real-time while eye 135 is viewing CGI 130. The eye image is analyzed by eyebox controller 125 to determine a location or gazing direction of eye 135 (process block 210). The determined location is then used to adjust the position CGI 130 displayed to eye 130 (process block 215). In the illustrated embodiment, eyebox controller 125 is coupled to eyebox actuator 115, which manipulates one or more components of light bending optics 110 and/or image source 105 to steer the CGI 130 to follow the motion of eye 135 thereby extending the effective size of eyebox 140. For example, if eye 135 looks left, eyebox actuator 115 can be made to mechanically and/or electrically manipulate the position or emission angle of CGI 130 such that the displayed CGI 130 also moves left to track eye 135.

Thus, eye tracking camera system 120 and eyebox controller 125 continuously monitor the position of eye 135 while it views CGI 130 (process block 220). If eye 135 moves (decision block 225), eyebox actuator 115 adjusts the image source 105 and/or light bending optics 110 to reposition CGI 130 (process block 230). Since eyebox 140 can move left or right to track eye movements, its lateral extent is increased, thereby extending the effective size of eyebox 140.

Eyebox controller 125 may be implemented in hardware (e.g., application specific integrated circuit, field programmable gate array, etc.) or be implemented as software or firmware executing on a microcontroller. Eye tracking camera system 120 includes a camera that is positioned to obtain real-time images of eye 135. This may be achieved by physically mounting an image sensor in directly line of sight of eye 135 (e.g., see FIG. 3), such as mounted to eyeglass frames and pointed eye-ward to face the user's eye 135. Alternatively, light bending optics may be used to deliver an eye image to a peripherally located camera sensor (e.g., see FIG. 12).

Figure 3:
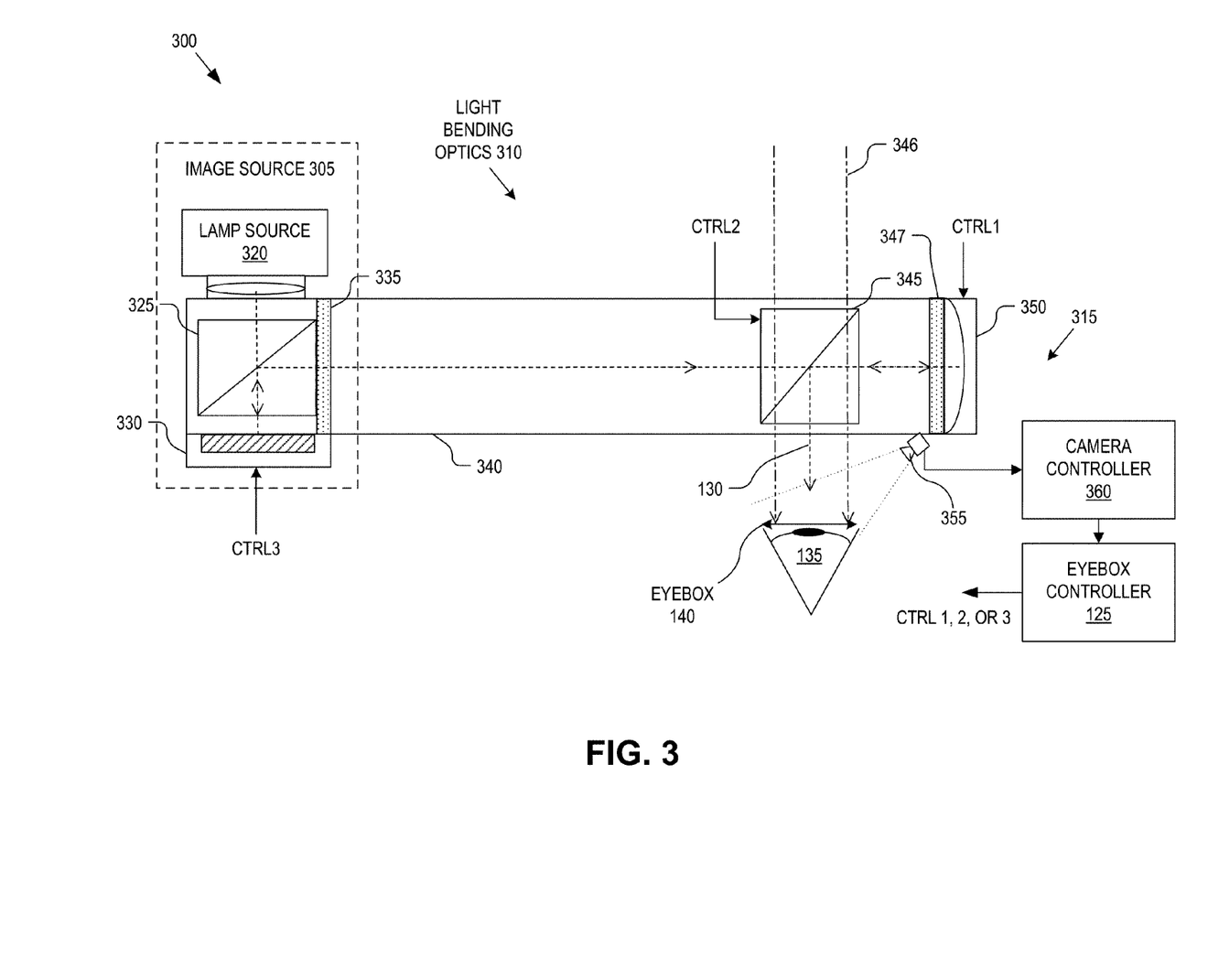
FIG. 3 is a block diagram illustrating an example HMD capable of extending an effective size of an eyebox using eye tracking data, in accordance with an embodiment of the disclosure.

FIG. 3 is a block diagram illustrating an example HMD system 300 capable of extending an effective size of eyebox 140 using eye tracking data, in accordance with an embodiment of the disclosure. HMD system 300 is one possible implementation of HMD system 100. The illustrated embodiment of HMD system 300 includes an image source 305, light bending optics 310, an eye tracking camera system 315, eyebox controller 125, and one or more eyebox actuators (discussed in connection with FIGS. 5-11). The illustrated embodiment of image source 305 includes a lamp source 320, an in-coupling beam splitter 325, a display panel 330, and a half-wave plate polarization rotator 335. The illustrated embodiment of light bending optics 310 includes a light relay 340, an out-coupling beam splitter 345, a quarter-wave plate polarization rotator 347, and an end reflector 350. The illustrated embodiment of eye tracking camera system 315 includes a camera 355 and a camera controller 360.

During operation, lamp source 320 generates lamp light used to illuminate display panel 330, which modulates image data onto the lamp light to create CGI 130. The lamp light generated by lamp source 320 is output into in-coupling beam splitter 325. In one embodiment, in-coupling beam splitter 325 is a polarizing beam splitter ("PBS") cube that substantially passes light of a first polarization (e.g., P polarization), while substantially reflecting light of a second polarization (e.g., S polarization). These two polarization components are typically orthogonal linear polarizations. The emitted light may be pre-polarized (e.g., P polarized) or unpolarized light. In either event, the P polarization component passes through the PBS cube to illuminate display panel 330 while most of any remaining portions of S polarization are back reflected. Thus, in the illustrated embodiment, display panel 330 is mounted in opposition to lamp source 305 with in-coupling beam splitter 325 disposed in between.

Display panel 330 (e.g., liquid crystal on silicon panel, digital micro-mirror display, etc.) imparts image data onto the lamp light via selective reflection by an array of reflective pixels. In an embodiment using an LCOS panel, reflection by display panel 330 rotates the polarization of the incident lamp light by 90 degrees. Upon reflection of the incident lamp light, the CGI light (which has been rotated in polarization by 90 degrees to be, for example, S polarized) is re-directed by in-coupling beam splitter 325 and propagates down light relay 340 along a forward propagation path towards end reflector 350. In an embodiment using a digital micro-mirror display, in-coupling beam splitter 325 may be implemented as a standard 50/50 non-polarizing beam splitter and the CGI light may be non-polarized light.

In one embodiment, CGI 130 is directed along the forward propagation path within light relay 340 without need of total internal reflection ("TIR"). In other words, the cross sectional shape and divergence of the light cone formed by CGI 130 is confined such that the light rays reach end reflector 350 without need of TIR off the sides of light relay 340.

In-coupling beam splitter 325, light relay 340, and out-coupling beam splitter 345 may be fabricated of a number of materials including glass, optical grade plastic, fused silica, PMMA, Zeonex-E48R, or otherwise. The length of light relay 340 may be selected based upon the temple-eye separation of the average adult and such that the focal plane of end reflector 350 substantially coincides with an emission aperture of display panel 330. To achieve focal plane alignment with the emission aperture of display panel 330, both the length of light relay 340 and the radius of curvature of end reflector 350 may be selected in connection with each other.

In the illustrated embodiment, light relay 340 includes half-wave plate polarization rotator 335 disposed within the forward propagation path of CGI 130. Half-wave plate polarization rotator 335 servers to rotate the polarization of CGI 130 by 90 degrees (e.g., convert the S polarized light back to P polarized light again).

The illustrated embodiment includes a partially reflective surface formed within out-coupling beam splitter 345. In one embodiment, out-coupling beam splitter 345 is partially transparent, which permits external (ambient) scene light 346 to pass through an external scene side and eye-ward side of light bending optics 310 to reach eye 135. A partially transparent embodiment facilitates an augmented reality ("AR") where CGI 130 is superimposed over external scene light 346 to the user eye 135. In another embodiment, light bending optics 310 is substantially opaque (or even selectively opaque) to external scene light 346, which facilitates a virtual reality ("VR") that immerses the user in the virtual environment displayed by CGI 130.

In one embodiment, out-coupling beam splitter 345 is an out-coupling PBS cube configured to pass one linear polarization (e.g., P polarization), while reflecting the other linear polarization (e.g., S polarization). Thus, the out-coupling PBS passes CGI 130 propagating along the forward propagation path to quarter wave-plate polarization rotator 347. After passing through quarter-wave plate polarization rotator 347, CGI 130 is reflected back along a reverse propagation path back towards out-coupling beam splitter 345. Thus, CGI 130 is rotated a total of 90 degree in polarization during its double pass through quarter-wave plate polarization rotator 347 and is S polarized by the time it strikes the out-coupling beam splitter 345 on the reverse propagation path.

In one embodiment, end reflector 350, both reflects and collimates CGI 130 such that CGI 130 traveling along the reverse propagation path is substantially collimated. Collimating (or nearly collimating) CGI 130 helps eye 135 to focus on CGI 130 emitted out the emission surface on the eye-ward side of light bending optics 310 in a near-to-eye configuration (e.g., emission surface placed within 10 cm of eye 135 and typically less than 5 cm of eye 130). CGI 130 is directed towards eye 135 due to the oblique orientation of the out-coupling beam splitter 345. In other embodiments, end reflector 350 merely reduces the divergence of CGI 130 without fully collimating CGI 130. In embodiments where one or both of in-coupling beam splitter 325 and out-coupling beam-splitter 345 are regular non-polarizing beam splitters, half-wave plate polarization rotator 335 and/or quarter-wave plate polarization rotator 347 may be omitted.

Figures 5A, 5B:
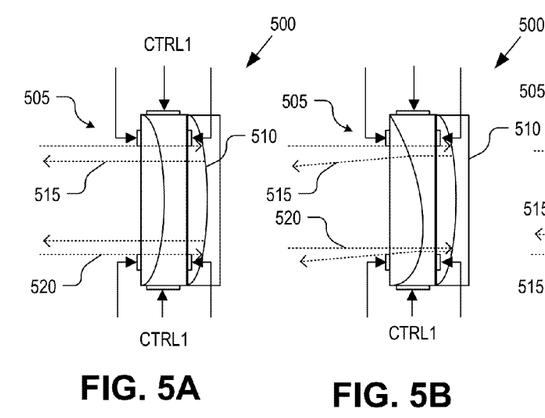
FIGS. 5A-C are diagrams illustrating an example eyebox actuator for extending an effective size of an eyebox using a liquid lens, in accordance with an embodiment of the disclosure.
Figure 6:
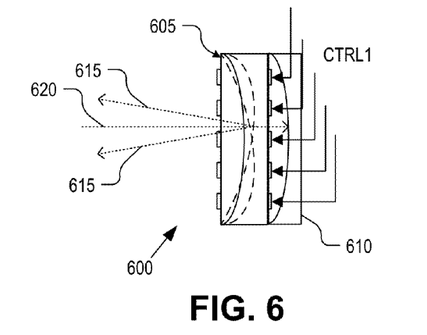
FIG. 6 is a diagram illustrating an example eyebox actuator for extending an effective size of an eyebox using a gradient refractive index ("GRIN") lens, in accordance with an embodiment of the disclosure.
Figure 7:
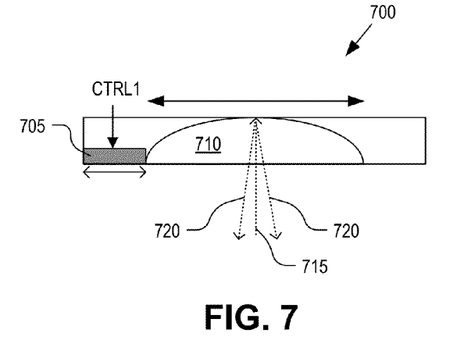
FIG. 7 is a diagram illustrating an example eyebox actuator for extending an effective size of an eyebox using a sliding end reflector, in accordance with an embodiment of the disclosure.

In some embodiments, end reflector 350 is an adjustable end reflector with eyebox actuator 115 incorporated into the adjustable end reflector to adjust a position or other optical properties of the adjustable end reflector to steer emitted CGI 130 (e.g., FIG. 5, 6, or 7). In these embodiments, eyebox controller 125 outputs a control signal CTRL1 for manipulating eyebox actuator 115 within the adjustable end reflector. In some embodiments, out-coupling beam splitter 345 is adjustable with eyebox actuator 115 to adjust a slidable position or angle of out-coupling beam splitter to steer emitted CGI 130 (e.g., FIG. 8 or 9). In these embodiments, eyebox controller 125 outputs a control signal CTRL2 for manipulating out-coupling beam splitter 345. In some embodiments, display panel 330 is adjustable to translate CGI output from display panel 330 (e.g., see FIGS. 10 and 11). In these embodiments, eyebox controller 125 outputs a control signal CTRL3 for manipulating the CGI output from display panel 330.

Figure 4A:
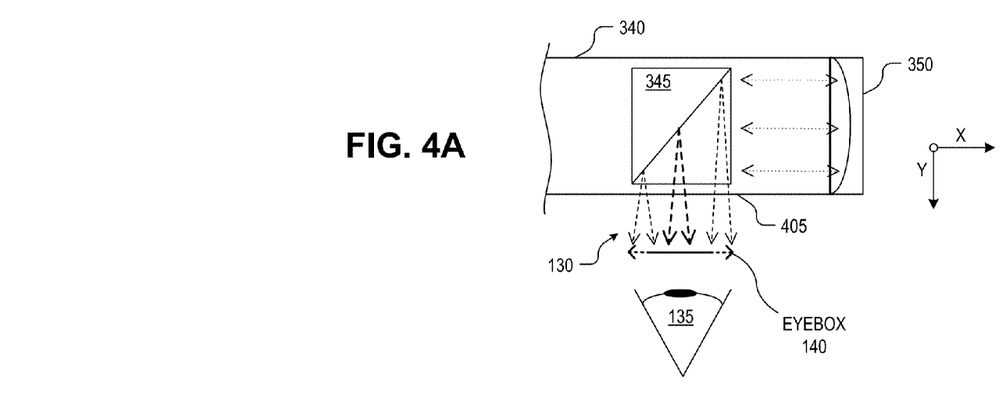
FIGS. 4A-4C illustrate how the effective size of an eyebox can be extended using eye tracking data, in accordance with an embodiment of the disclosure.
Figure 4B:
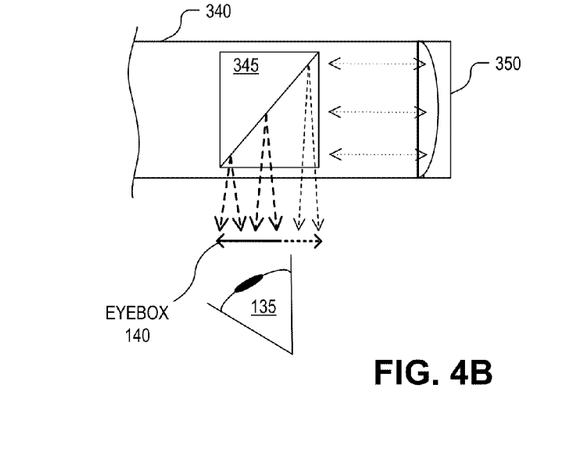
Figure 4C:
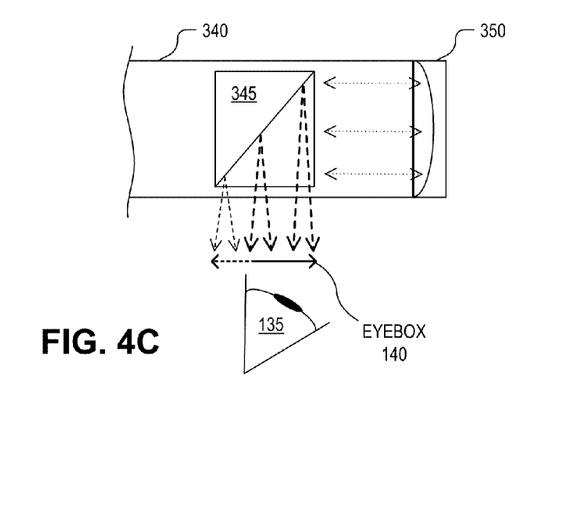

FIGS. 4A-4C illustrate how the effective size of eyebox 140 can be extended using eye tracking data, in accordance with an embodiment of the disclosure. Referring to FIG. 4A, eyebox 140 is typically approximately determined by the projection of out-coupling beam splitter 345 onto emission surface 405. However, the effective size of eyebox 140 may be somewhat smaller than this projection, since the light is not uniformly bright across its lateral extents (x-dimension). Rather, the light emitted in the middle (illustrated by a solid line on eyebox 140) may in fact represent the effective size of the eyebox 140. When eye 135 is looking straight forward, the effective size of eyebox 140 may be sufficient. However, when eye 135 changes its gaze either left FIG. 4B) or right (FIG. 4C), then the pupil may enter the reduced brightness peripheral region of the emission surface 405. Thus, embodiments disclosed herein are capable of steering or diverting the CGI 130 towards the peripheral regions in response to a determination of the current position of eye 135. If eye 135 is gazing left (FIG. 4B), then eyebox actuator 115 can bias CGI 135 exiting emission surface 405 towards the left to increase the brightness and image contrast on the left side of eyebox 140. If eye 135 is gazing right (FIG. 4C), then eyebox actuator 115 can bias CGI 135 exiting emission surface 405 towards the right to increase the brightness and image contrast on the right side of eyebox 140. This dynamic adjustment has the effect of extending the effective or useful size of eyebox 140.

Figure 5C:
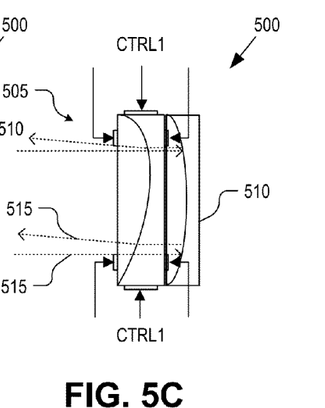

FIGS. 5A-C are diagrams illustrating an adjustable end reflector 500 for extending an effective size of an eyebox using a liquid lens, in accordance with an embodiment of the disclosure. Adjustable end reflector 500 is one possible implementation of end reflector 350. The illustrated embodiment of adjustable end reflector 500 includes liquid lens 505 and end reflector 510. Liquid lens 505 is an enclosure of two non-mixing liquids (e.g., oil and water). The surface tension at the interface between the two non-mixing liquids forms a lens shape. In this embodiment, eyebox actuator 115 may be implemented as a voltage controller coupled to apply one or more control voltages CTRL1 across liquid lens 505. The applied control voltages have the effect of adjusting the shape of the liquid lens using electrostatic forces. As illustrated in FIGS. 5B and 5C, the control voltages CTRL1 can control the shape such that the CGI traveling along reverse propagation path 515 after reflecting off end reflector 510 is selectively angled relative to the CGI traveling along the forward propagation path 520.

FIG. 6 is a diagram illustrating an adjustable end reflector 600 for extending an effective size of an eyebox using a gradient refractive index ("GRIN") lens, in accordance with an embodiment of the disclosure. Adjustable end reflector 600 is one possible implementation of end reflector 350. The illustrated embodiment of adjustable end reflector 600 includes GRIN lens 605 and end reflector 510. GRIN lens 605 is an enclosure of liquid crystal material. When a gradient voltage potential is applied across GRIN lens 605, an index of refraction gradient is formed within the liquid crystal material. This refraction gradient can be controlled to form different effective lens shapes. In this embodiment, eyebox actuator 115 may be implemented as a voltage controller coupled to apply one or more control voltages CTRL1 across GRIN lens 605. The applied control voltages have the effect of adjusting the lensing shape of GRIN lens 605 using electrostatic forces. In this manner, the control voltages CTRL1 can selectively control the angle of the CGI traveling along reverse propagation path 615 after reflecting off end reflector 610 relative to the CGI traveling along the forward propagation path 620.

FIG. 7 is a diagram illustrating an adjustable end reflector 700 for extending an effective size of an eyebox using a sliding end reflector, in accordance with an embodiment of the disclosure. Adjustable end reflector 700 is one possible implementation of end reflector 350. The illustrated embodiment of adjustable end reflector 700 includes one or more eyebox actuator(s) 705 and end reflector 710. Eyebox actuator(s) 705 operate to slide end reflector 710 back and forth in response to control signal(s) CTRL1. End reflector 710 may be implemented as a concave lensing reflector that is slidably mounted to the distal end of light relay 340. Eyebox actuator 705 may be implemented as piezoelectric crystals that expand and contract in response to control signal(s) CTRL1, a micro-electro-mechanical-systems ("MEMS") actuator responsive to control signal(s) CTRL1, an electrostatic actuator, or otherwise. By adjusting the position of end reflector 710, the forward propagating CGI 715 strikes a different part of end reflector 710, causing the backward propagating CGI 720 to be selectively reflected at different angles relative to the forward propagating CGI 715. In this manner, the control signal (s) CTRL1 can selectively control the angle of the CGI traveling along reverse propagation path 720 after reflecting off end reflector 710.

Figure 8:
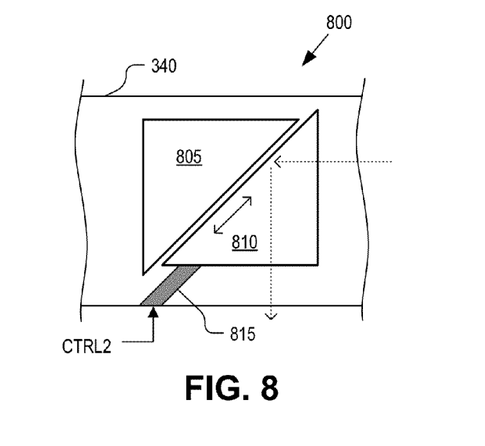
FIG. 8 is a diagram illustrating an example eyebox actuator for extending an effective size of an eyebox using a split sliding out-coupling beam splitter, in accordance with an embodiment of the disclosure.

FIG. 8 is a diagram illustrating an example eyebox actuator for extending an effective size of an eyebox using a split sliding out-coupling beam splitter 800, in accordance with an embodiment of the disclosure. Out-coupling beam splitter 800 is one possible implementation of out-coupling beam splitter 345. Out-coupling beam splitter 800 includes two prism portions 805 and 810 capable of sliding along the oblique partially reflective surface. In one embodiment, portion 810 is held fixed while portion 805, upon which the partially reflective surface is disposed, slides. Portion 805 is moved by eyebox actuator 815. Eyebox actuator 815 may be implemented with a piezo-electric crystal or a MEMS actuator coupled to be responsive to control signal CTRL2. Eyebox actuator 815 can be made to expand or contract, thereby pushing or pulling the movable portion 805 along the oblique axis of the out-coupling beam splitter 800. By moving the partially reflective surface, CGI 130 can be dynamically extended at the peripheries.

Figure 9:
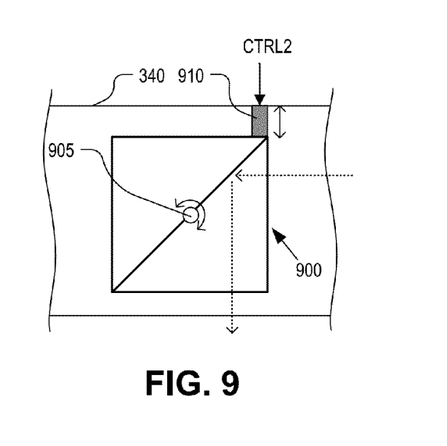
FIG. 9 is a diagram illustrating an example eyebox actuator for extending an effective size of an eyebox using a pivoting out-coupling beam splitter, in accordance with an embodiment of the disclosure.

FIG. 9 is a diagram illustrating an example eyebox actuator for extending an effective size of an eyebox using a rotating out-coupling beam splitter 900, in accordance with an embodiment of the disclosure. Out-coupling beam splitter 900 is one possible implementation of out-coupling beam splitter 345. Out-coupling beam splitter 900 is mounted to light relay 340 at pivot joints 905 (only one is illustrated). Eyebox actuator 910 is coupled to out-coupling beam splitter 900 to rotate it, thereby selectively changing the emission angle of CGI 130 in response to control signal CTRL2. Eyebox actuator 910 may be implemented with a piezo-electric crystal or a MEMS actuator coupled to be responsive to control signal CTRL2. Eyebox actuator 815 can be made to expand or contract, thereby pushing or pulling on out-coupling beam splitter 900 causing a moment about pivot joints 905.

Figure 10A:
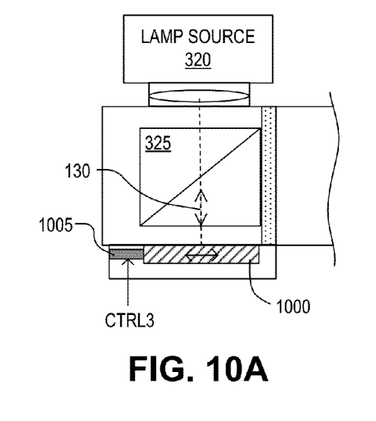
FIGS. 10A-C illustrate an example eyebox actuator for extending an effective size of an eyebox using a sliding display panel, in accordance with an embodiment of the disclosure.
Figure 10B:
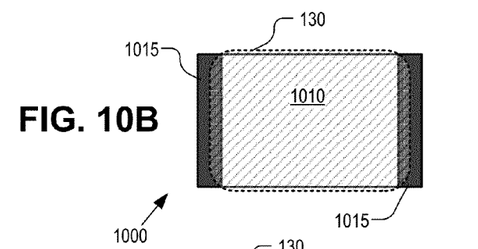
Figure 10C:
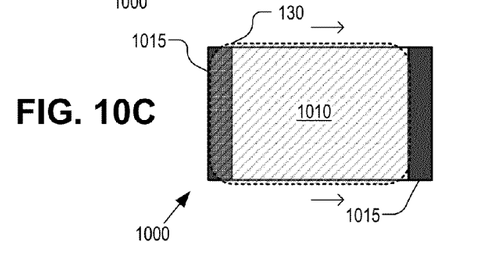

FIGS. 10A-C illustrate an example eyebox actuator for extending an effective size of an eyebox using a sliding display panel 1000, in accordance with an embodiment of the disclosure. Display panel 1000 is mounted to be illuminated by lamp source 320 via in-coupling beam splitter 325. Display panel 1000 may be secured in place using a sliding mount and coupled to eyebox actuator 1005. Display panel 1000 is moved by eyebox actuator 1005 in response to control signal CTRL3. Eyebox actuator 1005 may be implemented with a piezo-electric crystal or a MEMS actuator coupled to be responsive to control signal CTRL2. Eyebox actuator 1005 can be made to expand or contract, thereby pushing or pulling the display panel 1000 along its sliding axis. By sliding display panel 1000, CGI 130 can be dynamically extended at the peripheries. For example, display panel 1000 may include a pixelated reflective center portion 1010 with blackout non-reflective portions 1015 on either side (e.g., see FIG. 10B). By moving display panel 1000 to the right, the peripheral region on the right side of CGI 130 is extended.

Figures 11A, 11B:
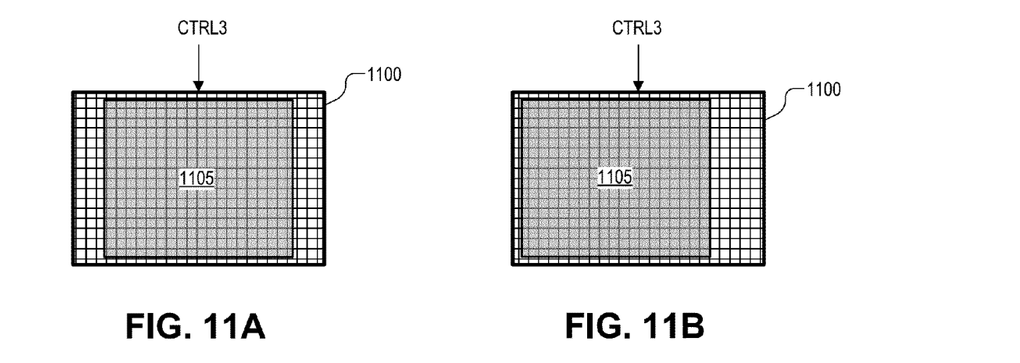
FIGS. 11A-B illustrate an example eyebox actuator for extending an effective size of an eyebox using a display panel that translates a reduced size image, in accordance with an embodiment of the disclosure.

FIGS. 11A-B illustrate an example eyebox actuator for extending an effective size of an eyebox using a display panel 1100 that translates a reduced size image 1105, in accordance with an embodiment of the disclosure. Display panel 1100 is mounted to be illuminated by lamp source 320 via in-coupling beam splitter 325. However, display panel 1100 is mounted in a fixed location and does not slide. Rather, display panel 1100 displays a reduced size image 1105 relative to the actual size of display panel 1100. In this embodiment, the eyebox actuator is the video controller, which translates reduced size image 1105 electronically within display panel 1100. The lamp light emitted from lamp source 320 illuminates the entire display panel 1100; however, only a subset of pixel corresponding to reduced side image 1105 are activated to modulate the CGI onto the reflected light. By way of example, by moving reduced side image 1105 to the left (see FIG. 11B), the peripheral region on the left side of CGI 130 is extended.

Figure 12:
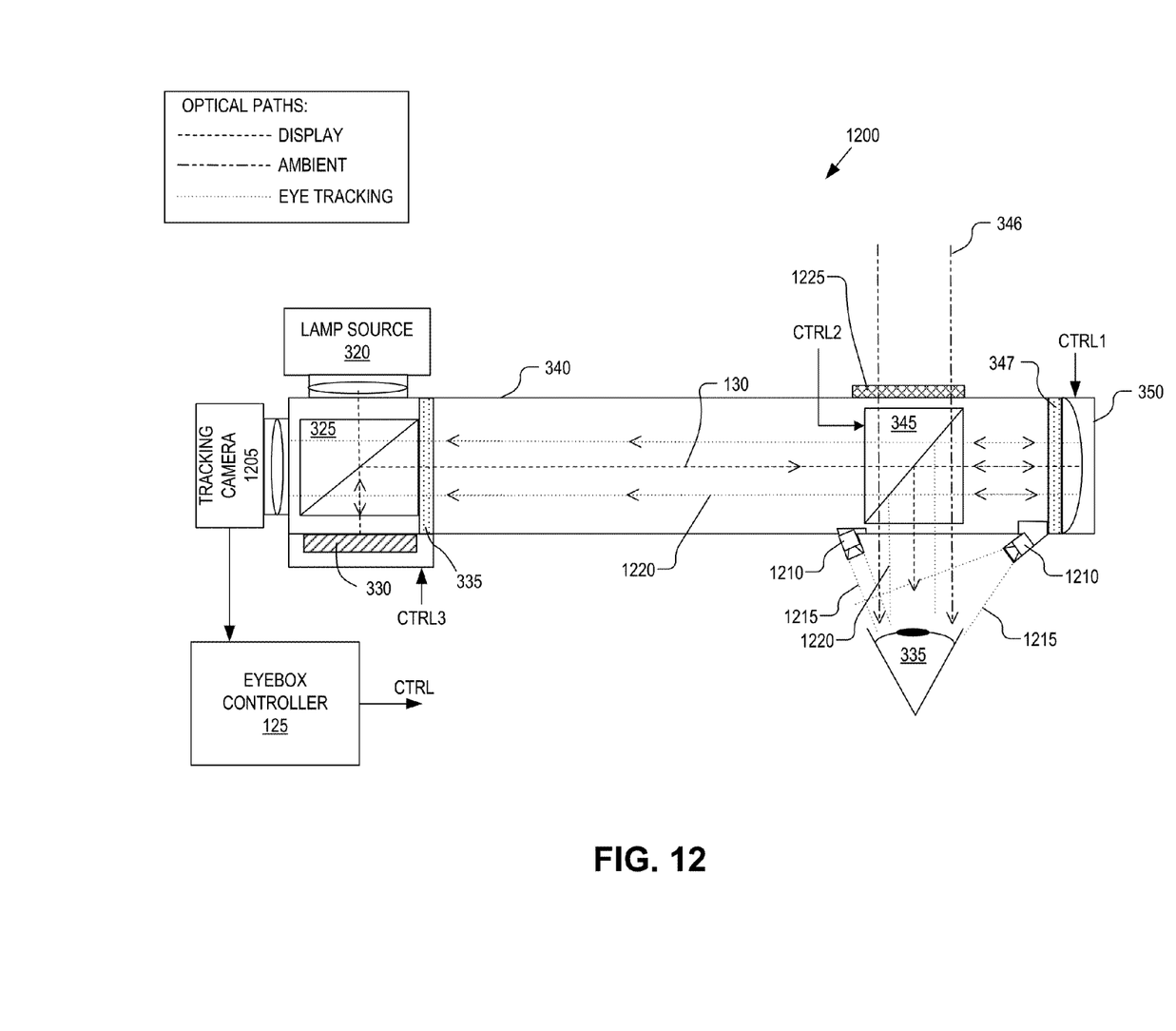
FIG. 12 illustrates an HMD with integrated near-to-eye display and eye tracking systems, in accordance with an embodiment of the disclosure.

FIG. 12 illustrates an HMD system 1200 with integrated near-to-eye display and eye tracking systems, in accordance with an embodiment of the disclosure. HMD system 1200 is similar to HMD system 300, except that the eye tracking system is integrated to use the same internal optics as the image display system. In particular, HMD system 1200 includes tracking camera 1205 and infrared ("IR") emitters 1210. IR emitters 1210 may be configured to emit non-polarized or S-polarized light 1215 to illuminate eye 335. IR light 1215 is reflected off of eye 335 as eye image 1220 back into out-coupling beam splitter 345. From there, eye image 1220 reverse traces the path taken by CGI 130 back to in-coupling beam splitter 325. When eye image 1220 reaches in-coupling beam splitter 325 it is p-polarized due to polarization rotators 335 and 347. Thus eye image 1220 passes through in-coupling beam splitter 325 and is impingent upon tracking camera 1205. Tracking camera 1205 captures eye image 1220 and generates eye tracking data, which is provided to eyebox controller 125 for analysis, as discussed above. The eye tracking data may be the eye image itself or preprocessed data. In one embodiment, an IR cut filter 1225 is disposed on the external scene side over the view region of light relay 340. IR cut filter 1225 block external IR light from interfering with the operation of the eye tracking system. The IR emitters 1210 may be positioned in various other locations than illustrated and may include only a single emitter or multiple emitters that emit non-polarized IR light, polarized IR light, or circularly polarized light.

Figure 13:
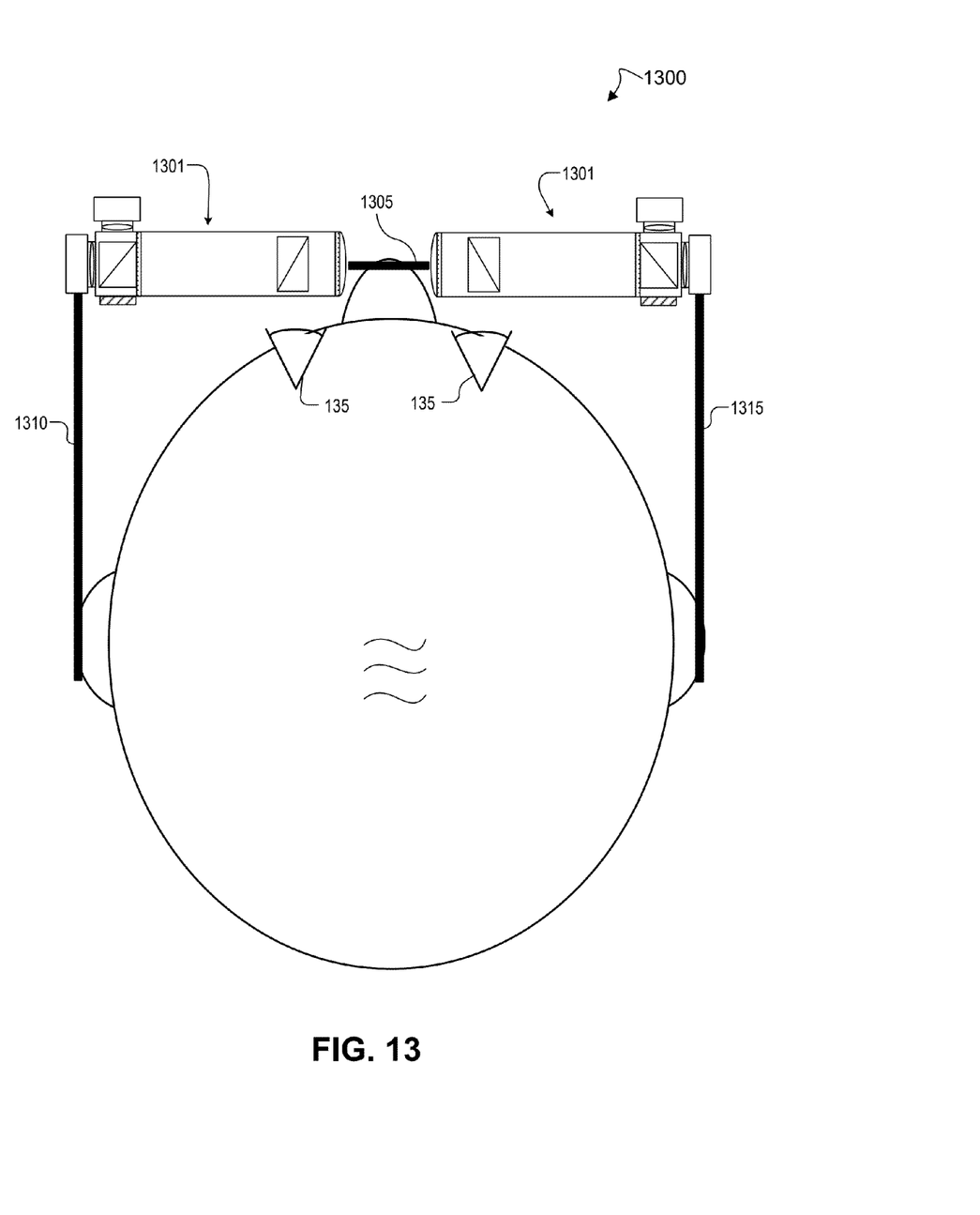
FIG. 13 illustrates an example binocular HMD capable of extending effective sizes of eyeboxes through which CGI is delivered to the eyes using eye tracking data, in accordance with an embodiment of the disclosure.

FIG. 13 is a top view of a binocular HMD system 1300 using a pair of HMDs 1301, in accordance with an embodiment of the disclosure. Each HMD 1301 may be implemented with embodiments of HMD systems 100, 300, or 1200, or combination thereof. Furthermore, each HMD 1301 may be implemented with an eyebox actuator and adjustable optics as disclosed in connection with any of FIGS. 5-11. The HMDs 1301 are mounted to a frame assembly, which includes a nose bridge 1305, left ear arm 1310, and right ear arm 1315. Although FIG. 13 illustrates a binocular embodiment; however, a single HMD 1301 may also be mounted to a frame for use as a monocular HMD with only a single eyepiece.

The two HMDs 1301 are secured into an eyeglass arrangement that can be worn on the head of a user. The left and right ear arms 1310 and 1315 rest over the user's ears while nose assembly 1305 rests over the user's nose. The frame assembly is shaped and sized to position an emission surface of the eyepiece in front of a corresponding eye 135 of the user. Of course, other frame assemblies having other shapes may be used (e.g., a visor with ear arms and a nose bridge support, a single contiguous headset member, a headband, goggles type eyewear, etc.).

The illustrated embodiment of binocular HMD system 1300 is capable of displaying an augmented reality to the user. The viewing region of each HMD 1301 is partially transparent and permits the user to see a real world image via external scene light. Left and right (binocular embodiment) CGI light may be generated by one or two CGI engines (not illustrated) coupled to a respective image source of each HMD 1301. The CGI light is seen by the user as virtual images superimposed over the real world as an augmented reality. In some embodiments, external scene light may be blocked or selectively blocked to provide a head mounted virtual reality display or heads up display.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus, comprising:
    an image source to generate display light;
    light bending optics to deliver the display light from the image source to a near-to-eye emission surface for emitting the display light to an eye of a user within an eyebox;
    an eye tracking camera system for acquiring an image of the eye for tracking movement of the eye;
    an eyebox actuator for adjusting a lateral position of the eyebox; and
    a controller coupled to the eye tracking camera system to receive image data and to determine a location of the eye based on the image data, the controller coupled to the eyebox actuator to control the eyebox actuator to dynamically adjust the lateral position of the eyebox to follow the movement of the eye in real-time such that the eyebox moves laterally when the eye looks left or right to dynamically extend an effective size of the eyebox from which the eye can view the display light,
    wherein the light bending optics comprise:
        a light relay optically coupled to the image source to receive the display light at a first end; and
        an adjustable end reflector disposed at an opposite end of the light relay from the first end coupled to the image source, the adjustable end reflector coupled to receive the display light along a forward propagating path and reflect the display light along a reverse propagating path, wherein the adjustable end reflector is coupled to the eyebox actuator to adjust an angle of the reverse propagating path responsive to the controller.

2. The apparatus of claim 1, wherein the adjustable end reflector comprises:
    an end reflector; and
    a liquid lens disposed between the end reflector and the light relay through which the forward and reverse propagating paths pass, the liquid lens to control the angle of the reverse propagating path,
    wherein the eyebox actuator comprises a voltage controller coupled to apply a voltage across the liquid lens to adjust a shape of the liquid lens in real-time in response to the location of the eye under control of the controller.

3. The apparatus of claim 1, wherein the adjustable end reflector comprises:
    an end reflector; and
    a gradient refractive index ("GRIN") lens disposed between the end reflector and the light relay through which the forward and reverse propagating paths pass, the GRIN lens to control the angle of the reverse propagating path,
    wherein the eyebox actuator further comprises a voltage controller coupled to apply a voltage across the GRIN lens to adjust a lensing characteristic of the GRIN lens in real-time in response to the location of the eye under control of the controller.

4. The apparatus of claim 1, wherein the adjustable end reflector comprises:
    an end reflector movably mounted to the light relay to slide relative to the light relay,
    wherein the eyebox actuator comprises one of a piezo-electric crystal or a micro-electro-mechanical-systems ("MEMS") actuator to slide the end reflector in real-time in response to the location of the eye under control of the controller.

5. The apparatus of claim 1, wherein the light bending optics further comprise:
    an out-coupling beam splitter disposed along the light relay between the image source and the adjustable end reflector, the out-coupling beam splitter to pass at least a portion of display light traveling along the forward propagating path and to reflect at least a portion of the display light traveling along the reverse propagating path out the emission surface,
    wherein the out-coupling beam splitter includes two beam splitter portions,
    wherein the eyebox actuator further comprises one of a piezo-electric crystal or a micro-electro-mechanical-systems ("MEMS") actuator to slide one of the two beam splitter portions relative to the other beam splitter portion in real-time in response to the location of the eye under control of the controller.

6. The apparatus of claim 1, wherein the light bending optics further comprise:
    an out-coupling beam splitter disposed along the light relay between the image source and the adjustable end reflector, the out-coupling beam splitter to pass at least a portion of display light traveling along the forward propagating path and to reflect at least a portion of the display light traveling along the reverse propagating path out the emission surface, wherein the out-coupling beam splitter is pivotally mounted within the light relay, wherein the eyebox actuator further comprises one of a piezo-electric crystal or a micro-electro-mechanical-systems ("MEMS") actuator to pivot the out-coupling beam splitter in real-time in response to the location of the eye under control of the controller.

7. The apparatus of claim 6, wherein the beam splitter comprises a polarizing beam splitter and wherein the light bending optics further include a half-wave plate rotator disposed in the forward propagating path of the display light between the out-coupling beam splitter and a quarter-wave plate rotator disposed in the forward and reverse propagating paths between the out-coupling beam splitter and the end reflector.

8. The apparatus of claim 1, wherein the image source comprises:
   a lamp source;
   a liquid crystal on silicon ("LCOS") display panel positioned to be illuminated by the lamp source and to selectively reflect lamp light as the display light; and
   an in-coupling beam splitter positioned adjacent to the LCOS display panel to redirect the display light from the LCOS display panel along a forward propagating path within the light bending optics,
   wherein the eyebox actuator further comprises one of a piezo-electric crystal or a micro-electro-mechanical-systems ("MEMS") actuator to slide the LCOS display panel relative to the in-coupling beam splitter in real-time in response to the location of the eye under control of the controller.

9. The apparatus of claim 1, wherein the image source comprises:
   a lamp source;
   a liquid crystal on silicon ("LCOS") display panel positioned to be illuminated by the lamp source and to selectively reflect lamp light as the display light; and
   an in-coupling beam splitter positioned adjacent to the LCOS display panel to redirect the display light from the LCOS display panel along a forward propagating path within the light bending optics,
   wherein the eyebox actuator further comprises a video controller that translates a position of a display image produced by the display light in real-time in response to the location of the eye under control of the controller, wherein the display image has fewer pixels than the LCOS display panel such that only a portion of the LCOS display panel is used to generate the display image at a given time.

10. A head mounted display, comprising:
    an image source to generate display light;
    light bending optics to deliver the display light from the image source to a near-to-eye emission surface for emitting the display light to an eye of a user within an eyebox;
    an eye tracking camera system for acquiring an image of the eye for tracking movement of the eye;
    an eyebox actuator for adjusting a lateral position of the eyebox;
    a controller coupled to the eye tracking camera system to receive image data and to determine a location of the eye based on the image data, the controller coupled to the eyebox actuator to control the eyebox actuator to dynamically adjust the lateral position of the eyebox to follow the movement of the eye in real-time such that the eyebox moves laterally when the eye looks left or right to extend an effective size of the eyebox from which the eye can view the display light; and
    a frame assembly to support the image source, the light bending optics, the eye tracking camera system, the eyebox actuator, and the controller for wearing on a head of the user with the emission surface positioned in front of the eye of the user,
    wherein the light bending optics comprise:
       a light relay optically coupled to the image source to receive the display light at a first end;
       an end reflector disposed at an opposite end of the light relay from the first end coupled to the image source, the adjustable end reflector coupled to receive the display light along a forward propagating path and reflect the display light along a reverse propagating path, wherein the adjustable end reflector is coupled to the eyebox actuator to adjust an angle of the reverse propagating path responsive to the controller.

11. The head mounted display of claim 10, wherein the adjustable end reflector comprises:
    an end reflector; and
    a liquid lens disposed between the end reflector and the light relay through which the forward and reverse propagating paths pass, the liquid lens to control the angle of the reverse propagating path,
    wherein the eyebox actuator comprises a voltage controller coupled to apply a voltage across the liquid lens to adjust a shape of the liquid lens in real-time in response to the location of the eye under control of the controller.

12. The head mounted display of claim 10, wherein the adjustable end reflector comprises:
    an end reflector; and
    a gradient refractive index ("GRIN") lens disposed between the end reflector and the light relay through which the forward and reverse propagating paths pass, the GRIN lens to control the angle of the reverse propagating path,
    wherein the eyebox actuator comprises a voltage controller coupled to apply a voltage across the GRIN lens to adjust a lensing characteristic of the GRIN lens in real-time in response to the location of the eye under control of the controller.

13. The head mounted display of claim 10, wherein the adjustable end reflector comprises:
    an end reflector movably mounted to the light relay to slide relative to the light relay,
    wherein the eyebox actuator comprises one of a piezo-electric crystal or a micro-electro-mechanical-systems ("MEMS") actuator to slide the end reflector in real-time in response to the location of the eye under control of the controller.

14. The head mounted display of claim 10, wherein the light bending optics further comprise:
    an out-coupling beam splitter disposed along the light relay between the image source and the end reflector, the out-coupling beam splitter to pass at least a portion of display light traveling along the forward propagating path and to reflect at least a portion of the display light traveling along the reverse propagating path out the emission surface,
    wherein the out-coupling beam splitter is pivotally mounted within the light relay,
    wherein the eyebox actuator further comprises one of a piezo-electric crystal or a micro-electro-mechanicalsystems ("MEMS") actuator to pivot the out-coupling beam splitter in real-time in response to the location of the eye under control of the controller.

15. The head mounted display of claim 10, wherein the image source comprises:
   a lamp source;
   a liquid crystal on silicon ("LCOS") display panel positioned to be illuminated by the lamp source and to selectively reflect lamp light as the display light; and
   an in-coupling beam splitter positioned adjacent to the LCOS display panel to redirect the display light from the LCOS display panel along a forward propagating path within the light bending optics,
   wherein the eyebox actuator further comprises one of a piezo-electric crystal or a micro-electro-mechanical-systems ("MEMS") actuator to slide the LCOS display panel relative to the in-coupling beam splitter in real-time in response to the location of the eye under control of the controller.

16. The head mounted display of claim 10, wherein the image source comprises:
   a lamp source;
   a liquid crystal on silicon ("LCOS") display panel positioned to be illuminated by the lamp source and to selectively reflect lamp light as the display light; and
   an in-coupling beam splitter positioned adjacent to the LCOS display panel to redirect the display light from the LCOS display panel along a forward propagating path within the light bending optics,
   wherein the eyebox actuator further comprises a video controller that translates a display image produced by the display light in real-time in response to the location of the eye under control of the controller, wherein the display image has fewer pixels than the LCOS display panel such that only a portion of the LCOS display panel is used to generate the display image at a given time.

* * * * *